(12) United States Patent
Kim et al.

(10) Patent No.: US 7,023,850 B2
(45) Date of Patent: Apr. 4, 2006

(54) MULTICASTING APPARATUS AND METHOD IN SHARED MEMORY SWITCH

(75) Inventors: Chan Kim, Taejon (KR); Tae-Whan Yoo, Taejon (KR); Jong-Hyun Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 816 days.

(21) Appl. No.: 09/938,630

(22) Filed: Aug. 27, 2001

(65) Prior Publication Data
US 2002/0080787 A1 Jun. 27, 2002

(30) Foreign Application Priority Data
Dec. 27, 2000 (KR) ............................... 2000-83269

(51) Int. Cl.
*H04L 12/56* (2006.01)

(52) U.S. Cl. ............... 370/390; 370/395.7; 370/395.72

(58) Field of Classification Search ............ 370/395.7, 370/395.72, 412, 428, 429, 395.71, 390, 370/379
See application file for complete search history.

(56) References Cited
U.S. PATENT DOCUMENTS
5,923,654 A * 7/1999 Schnell .................. 370/390

| | | |
|---|---|---|
| 6,128,278 A | 10/2000 | Joffe et al. |
| 6,128,295 A | 10/2000 | Larsson et al. |
| 6,144,662 A | 11/2000 | Colmant et al. |
| 6,789,176 B1 * | 9/2004 | Uriu et al. .................. 711/154 |

* cited by examiner

Primary Examiner—Ricky Ngo
Assistant Examiner—Nguyen H. Ngo
(74) Attorney, Agent, or Firm—Mayer, Brown, Rowe & Maw LLP

(57) ABSTRACT

A multicasting system and method for use in a shared memory-based switch that includes an input subqueue reading block for reading out data inputted thereto, selecting one bit from an output port bitmap at a time and outputting output port information of one bit and class information as a data stream together with an enable signal. The system also includes a queue number encoding block for encoding the bitmap type of output port information provided thereto from the input subqueue reading means, creating a queue number of the output subqueues based on the encoded output port information and the class information and outputting the same together with an enable signal; and an output subqueue writing block for writing an assigned non-use address of the output subqueues in a tail address of corresponding output subqueue, responsive to the information from the input subqueue reading means and replacing a subsequent tail address of the corresponding output subqueue with a newly assigned non-use address, thereby writing a corresponding pointer in the corresponding output subqueue.

11 Claims, 8 Drawing Sheets

MULTICASTING APPARATUS AND METHOD IN SHARED MEMORY SWITCH

FIELD OF THE INVENTION

The present invention relates to a multicasting apparatus and method thereof in a shared memory asynchronous transfer mode ("ATM") cell or a variable length packet switch, and a computer-readable medium storing a program for implementing the above method. More particularly, the present invention is to multicast a pointer content (an address in which data is stored) of input subqueues to a plurality of corresponding output subqueues at the maximum speed. Further, the present invention is to maintain a coherency of memory value in continuously reading, modifying and writing a counter in the memory.

DESCRIPTION OF THE PRIOR ART

In design of a shared memory switch, a data storage memory is divided a plurality of small-size regions for the management of resources. Such a configuration, if a region is necessary for storing received data therein, an address that is not in use is retrieved from a non-use address list for the storage of the received data thereto, and then the data of the address is read out according to schedule, returning the address to the non-use address list.

In the shared memory with a multicasting capability, actual data is stored only once.

As a scheme of implementing the multicasting, there is a scheme of storing addresses in which data is stored, i.e., pointers, in an input subqueue, retrieving one address at a time and delivering the same to a corresponding output subqueue according to an output port and class corresponding thereto.

In this case, inserting the pointer to several output subqueues performs the multicasting. Such a sequence of duplication and movement processes is launched by reading out the input subqueue and reading out a target port that is typically indicated in a bitmap fashion. The preceding process is then followed by selecting one among a plurality of bits at a time and writing the same in a corresponding output subqueue based on a corresponding class, wherein all bits should be selected for port bitmap data read from the input subqueue only once. When an item has been processed, subsequent data is read out of the input subqueue for the process thereof.

However, in such a case, a method that fails to process at a maximum speed prevents all clock cycles from being used during the movement of the pointer, resulting in a bottleneck at the place, thereby adversely affecting the overall performance of the system.

Accordingly, there is a need for a method, which forwards the pointer to the output subqueue without losing any clock.

Alternatively, in another scheme of implementing the multicasting, when the pointer is inserted in a plurality of output subqueues, each output port processor reads itself output subqueue and reads out data from a shared memory associated with a corresponding pointer. Each of the output port processor should store a finally read number in each address to forward a corresponding address to an unused list after reading out data as the number of the multicasting. Further, since the number read until now has been written in each address, the output port processor should increase the written number at each instant of the read step, and compares same with the final count value to determine whether all data have been read out.

While the reading for each area of the memory may be performed every clock, it is difficult to perform a sequence of the read-latch-increment-write processes at one clock, which will require latching the data once based on an access time to the memory for the use thereof. Thus, a sequence of the read-latch-increment-write processes should be performed at four clocks in that order. In this case, since an access to the same address in the memory may be consecutively occurred, in some case an address may be read out before being writing an increased value of data previously read in the address, resulting in an increased chance for read error and preventing the read and write process for the same address from being simultaneously occurred.

Accordingly, there is a need for a method, which maintains consistency of a memory value during a sequence of, read, modification and writes for a counter in the memory.

SUMMARY OF THE INVENTION

It is, therefore, an object of the present invention to provide a system and method, for use in a shared memory-based switch, which is capable of multicasting a pointer content of input subqueue into a plurality of corresponding output subqueues at a maximum speed, thereby allowing the pointer to be forwarded to the output subqueues every time.

It is another object of the present invention to provide a computer-readable medium storing a program for implementing the above method therein.

In accordance with one aspect of the present invention, there is provided a multicasting apparatus in a shared memory switch, comprising: an input subqueue reading means for reading out data inputted thereto, selecting one bit from an output port bitmap at a time and outputting output port information of one bit and class information as a data stream together with an enable signal, wherein when ready data is presented in the input subqueue, the input subqueue reading means also reads out the input subqueue prior to the completion of all data processing and continuously sustains its output data stream; a queue number encoding means for encoding the bitmap type of output port information provided thereto from the input subqueue reading means, creating a queue number of the output subqueues based on the encoded output port information and the class information and outputting the same together with an enable signal; and an output subqueue writing means for writing an assigned non-use address of the output subqueues in a tail address of corresponding output subqueue, responsive to the information from the input subqueue reading means and replacing a subsequent tail address of the corresponding output subqueue with a newly assigned non-use address, thereby writing a corresponding pointer in the corresponding output subqueue.

In accordance with another aspect of the present invention, there is provided a multicasting method in a shared memory switch, comprising the following steps of: storing a pointer indicating an address in which data is stored in an input subqueue and forwarding the same to an output subqueue based on an output port bitmap and a class of the data, wherein when the data is multicast data, the same pointer is duplicated to be forwarded to a plurality of output subqueues; and selecting one bit for the data read out of the input subqueue at a time to create a bitmap stream selected only one bit, when the pointer is forwarded from the input subqueue to the corresponding output subqueue, wherein in case ready data is presented in the input subqueue, the data stored in the input subqueue is read out before being processed all data, thereby preventing a waiting time between data of the input subqueue from being occurred.

In accordance with still another aspect of the present invention, there is provided a multicasting method in a shared memory switch, wherein a final number by which each address is to be read out for multicasting is stored the addresses of a first predetermined memory; a number reading out a corresponding address at a time is stored in a second predetermined memory distinct from the first predetermined memory, allowing a read value to be increased at each instant of the reading of the corresponding address of the shared memory, wherein the increased value is compared with the final number; if the increased value is less than the final number, the increased value is increased by one; and if the increased value is equal to the final number, the increased value is set to be zero, to thereby allowing the address of the shared memory to be returned to an unused address list.

In accordance with one aspect of the present invention, there is provided a computer-readable medium storing a program for implementing the following functions of storing a pointer indicating an address in which data is stored in an input subqueue and forwarding the same to an output subqueue based on an output port bitmap and a class of the data, wherein when the data is multicast data, the same pointer is duplicated to be forwarded to a plurality of output subqueues; and selecting one bit for the data read out of the input subqueue at a time to create a bitmap stream selected only one bit, when the pointer is forwarded from the input subqueue to the corresponding output subqueue, wherein in case ready data is presented in the input subqueue, the data stored in the input subqueue is read out before being processed all data, thereby preventing a waiting time between data of the input subqueue from being occurred.

In accordance with still aspect of the present invention, there is provided a computer-readable medium storing a program for implementing a function in which a final number by which each address is to be read out for multicasting is stored the addresses of a first predetermined memory; a number reading out a corresponding address at a time is stored in a second predetermined memory distinct from the first predetermined memory, allowing a read value to be increased at each instant of the reading of the corresponding address of the shared memory, wherein the increased value is compared with the final number; if the increased value is less than the final number, the increased value is increased by one; and if the increased value is equal to the final number, the increased value is set to be zero, to thereby allowing the address of the shared memory to be returned to an unused address list.

The present invention is to multicast a pointer content of input subqueue to a plurality of corresponding output subqueues at a maximum speed, thereby allowing the pointer to be forwarded to the output subqueues every time. Further, the present invention is to overcome a problem that may be occurred when a writing process is performed every clock, wherein the writing process is accomplished by reading the same address by a predetermined number, reading a counter of the memory over four clocks to return it to a non-use address list, comparing the same with a final value and increases the read value by one or resets to be zero, during the service of an output port-class subqueue.

The process of forwarding the input subqueue to the output subqueue is to transmit a pointer presented in the input subqueue to a plurality of output subqueues according to routing information. The routing information includes a bitmap type of output port information and corresponding class information. When read data is presented in the input subqueue, the input subqueue should be read to allow the writing for the output subqueue to be continuously performed during the process of previous and subsequent data.

Further, the read number of data presented in a particular address of the shared memory is previously written in the same address of another memory, the number that data of each address is read is written in each address of a separate memory, wherein the counter is read at each instant data of the corresponding address is read out; the read value is compared with the final number; if the read value is less than the final number, the read value is increased by one; and if the read value is equal to the final number, the read value is set to be zero, to thereby allowing the address of the shared memory to be returned to the unused address list.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

First, a detailed description will be directed to a method of forwarding a pointer from an input subqueue to output subqueues.

Figure 1:
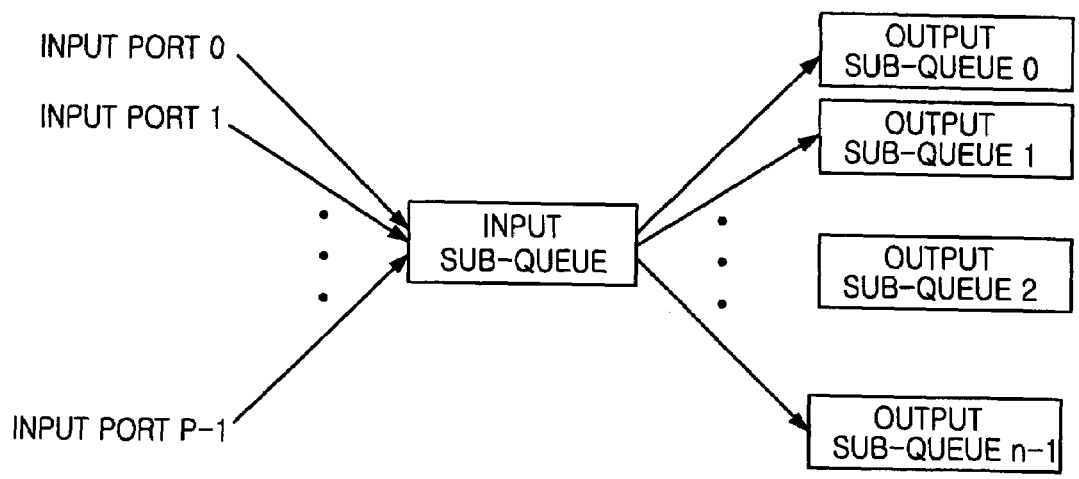
FIG. 1 shows a queue structure used in a shared memory switch for which the present invention is applicable.

FIG. 1 shows a queue structure used in a shared memory switch for which the present invention is applicable.

As shown in FIG. 1, an address of the shared memory is allocated to only valid one among data inputted via all input ports, and a bitmap value of an output port corresponding to the address and the data and a class value of the data are paired to be sequentially forwarded to the input subqueue. Thereafter, each data stored in the input subqueue is read out one at a time, being transmitted it to an output subqueue corresponding to each read data according to a corresponding output port and class.

Assuming that the number of the input ports is p and that of the classes is c, the total number of the subqueues is set to be "p×c".

An apparatus of multicasting a pointer from the input subqueue to the output subqueues falls into three main parts, which will be described in detail with reference to FIG. 2.

Figure 2:
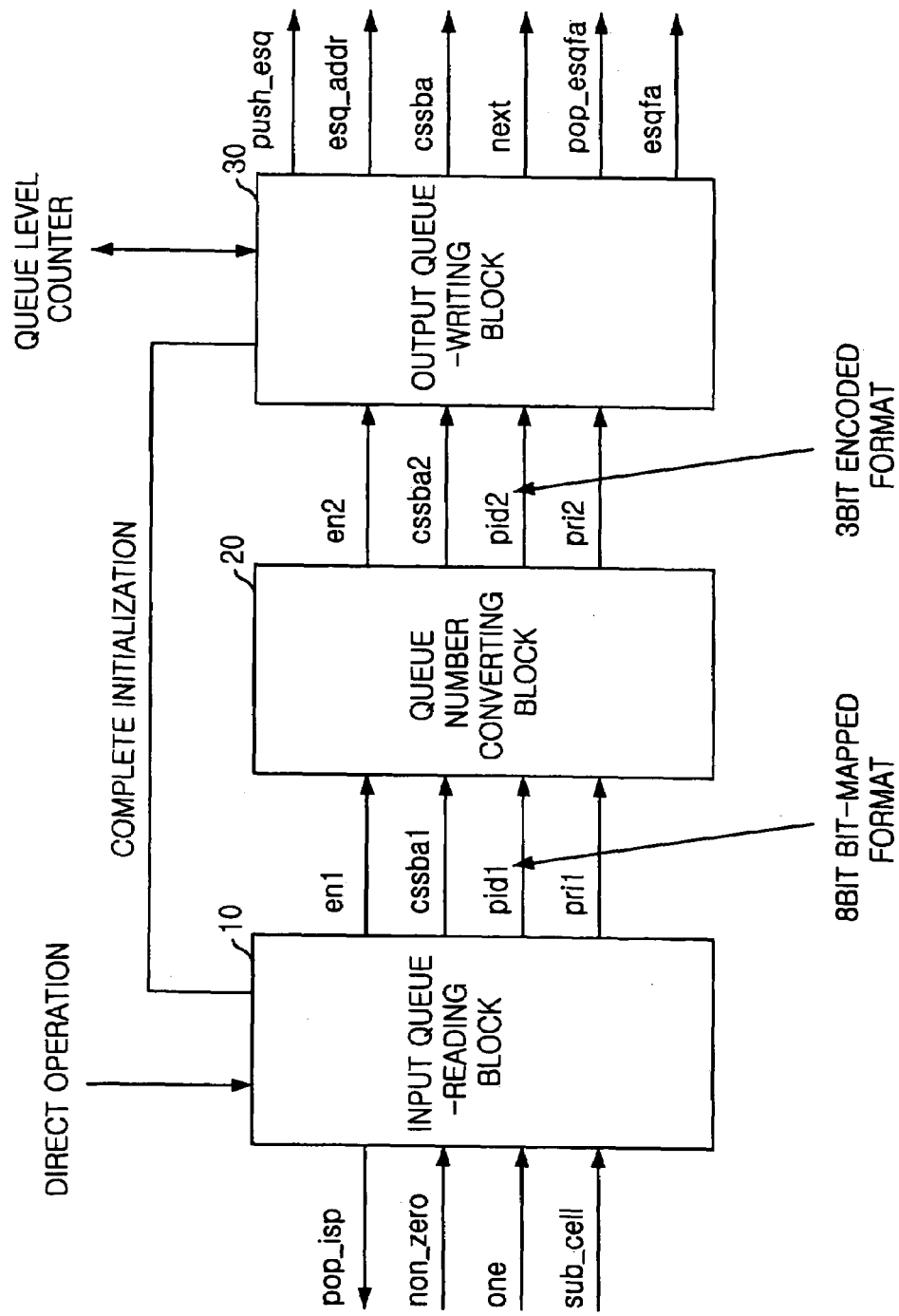
FIG. 2 is an illustrative block diagram of a multicasting apparatus of the present invention.

In FIG. 2, "en1", "cssba1", "pid1" and "pri1" represent an enable signal, an address of the shared memory in which a packet is stored, a bitmap type of port identifier in which only one bit is set to be "1", and a priority (class) of the packet, respectively.

And, "en2", "cssba2", "pid2" and "pri2" are the outputs of a queue number converting block 20, each of which represents an enable signal, a shared memory address, an encoded output port identifier and a priority.

As shown in FIG. 2, the multicasting apparatus of the present invention comprises an input queue-reading block 10, the queue number converting block 20 and an output queue-writing block 30. The input queue reading block 10 reads out data inputted thereto, selects one bit from an output port bitmap at a time and outputs output port information of one bit and class information as a data stream together with the enable signal. When ready data is presented in the input subqueue, the input queue-reading block 10 also reads out the input subqueue prior to the completion of all data processing and continuously sustains its output data stream. The queue number converting block 20 encodes the bitmap type of output port information provided thereto from the input queue reading block 10, creates a queue number of the output subqueues based on the encoded output port information and the class information and outputs the same together with an enable signal. The output queue writing block 30 writes an assigned non-use address of the output subqueues in a tail address of corresponding output subqueue based on the information from the input queue reading block 10 and replaces a subsequent tail address of the corresponding output subqueue with a newly assigned non-use address, thereby writing a corresponding pointer in the corresponding output subqueue.

In the above, each pointer is first stored and is forwarded to the output subqueue based on the output port bitmap and the class of the read data wherein when the data is multicast data, the same pointer is duplicated to be forwarded to a plurality of output subqueues.

Next, selecting one bit for the data read out of the input subqueue at a time creates a bitmap stream selected only one bit. In case ready data is presented in the input subqueue, the data stored in the input subqueue is read out before being processed all data, thereby preventing a waiting time between data of the input subqueue from being occurred.

The input queue reading block 10, which forwards the pointer from the input subqueue to the output subqueues, reads the input subqueue and outputs the enable signal, the bitmap type of output port information in which only one bit is set to be one, and the class information when it is in use, as a data stream.

The queue number converting block 20, responsive to the information provided thereto from the input queue reading block 10, outputs the enable signal and the encoded output port information as a data stream.

The output queue writing block 30, based on the information from the queue number converting block 20, receives an assigned non-use address about a corresponding output subqueue and writes the same together with the pointer in the corresponding output subqueue, connecting it to a linked-list. Simultaneously, the output queue writing block 30 stores the non-use address used in the above as a tail address that is to be subsequently used in the output subqueue.

The input queue-reading block 10 receives information representing the presence or absence of data in the input subqueue, or whether or not the data is a unique data. Such information is needed to previously sense whether the process stops or progresses, since the input subqueue read signal should be outputted before updating a signal representing the presence or absence of the data in the input subqueue.

Further, the input queue reading block 10 receives an operation enable signal from a main control block (not shown) and a ready signal from the output queue writing block 30 and begins its operation based on the input signals, wherein the ready signal represents whether the output queue writing block 30 is in an operable condition. Responsive to the ready signal, the input queue-reading block 10 is rendered operative. In case the output subqueue is composed of the linked-list, the output queue writing block 30 should be to have the non-use address for each output subqueue as a tail address to be firstly used, requiring a time for early retrieving the non-use address and thus the ready signal.

When the read result of the input subqueue is referred to as a sub-cell, the sub-cell data includes a bitmap and class for a target port, and an address of the shared memory in which data is stored.

The output queue writing block 30, which serves to write a pointer value on a corresponding output subqueue according to a queue identifier, writes the pointer on the tail address of a current output subqueue and simultaneously retrieves a non-use address of the output subqueue to use it as a next tail address thereof. The new tail address is written with the writing of the pointer, allowing packets to be linked in the linked-list within the output subqueue. Since it requires a time to retrieve the non-use address from the output subqueue, the output queue-writing block 30 employs a pipeline scheme to allow the input data to be used after a predetermined delay during retrieving the new non-use address.

The output queue-writing block 30 transmits information indicating an increase in output subqueue to an external queue level counting block or a meter block, allowing a scheduling to be launched.

The performance of transmitting the pointer from the input subqueue to the output subqueue depends on the input queue-reading block 10. An internal configuration of the input queue-reading block 10 is shown in FIG. 3.

Figure 3:
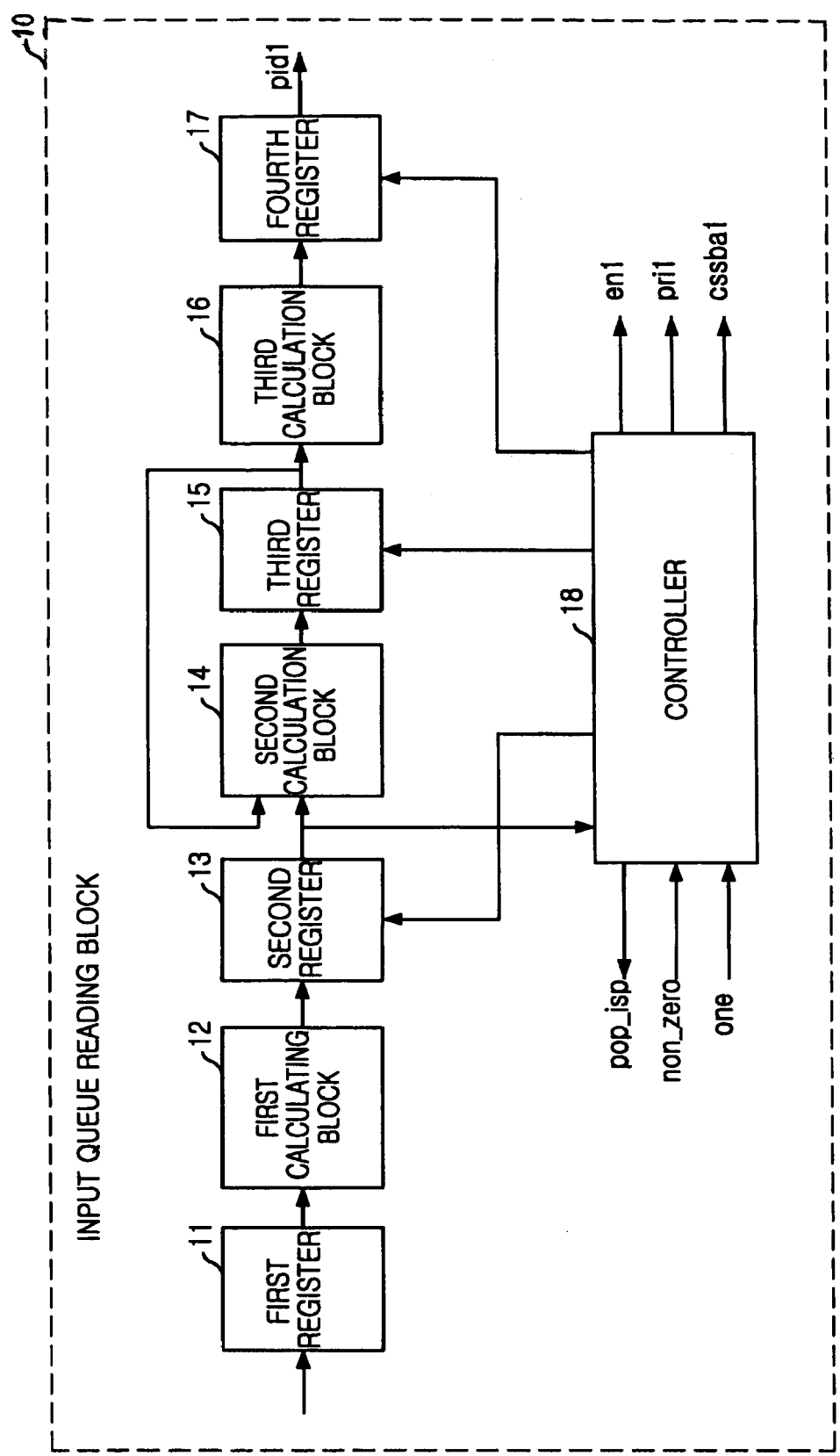
FIG. 3 is a detailed block diagram of an input queue reading block shown in FIG. 1.

As shown in FIG. 3, the input queue reading block 10 includes: a controller 18 for controlling a movement and selection of data; a first register 11 for latching and storing therein the sub-cell data of the input subqueue; a first calculating block 12 for calculating a next value (waiting value) in a second register 13; the second register 13 for holding a waiting sub-cell data which is not being currently processed responsive to a control signal (i.e., a latch enable signal and a data selection signal) from the controller 18; a second calculation block 14 for calculating a next value (remaining value) in a third register 15; the third register 15 for holding data which is in process and have bits not yet selected, responsive to the control signal from the controller 18; a third calculation block 16 for calculating a next value (selected value) in a fourth register 17; and the fourth register 17 for latching one bit at a time based on the control signal from the controller 18. The first, second and third calculation blocks 12, 14 and 16 may be a combined logic circuit.

The controller 18 serves to control the input and output functions of the input queue reading block 10 and hence generate the latch enable signal and the data selection signal to the second register 13, the third register 15 and fourth register 17.

The condition for transmitting of data from one register to a subsequent register may be induced from a status of each stage and its subsequent stage or only a status of previous stage. Further, a condition that the read signal of the input subqueue is asserted depends on the operation enable signal, the ready signal from the output queue writing block 30, a status of the input subqueue, and the presence or absence of data in the first to third registers 11, 13 and 15.

FIGS. 4A to 4E are flowcharts illustrating a condition that the read signal of the input subqueue is generated and a condition that a value of each register is selected. In FIGS. 4A to 4E, the presence or absence of data in each register may determined by a flag of corresponding register and a setting condition of each flag is also shown. The above process is repeated for each clock.

Figure 4A:
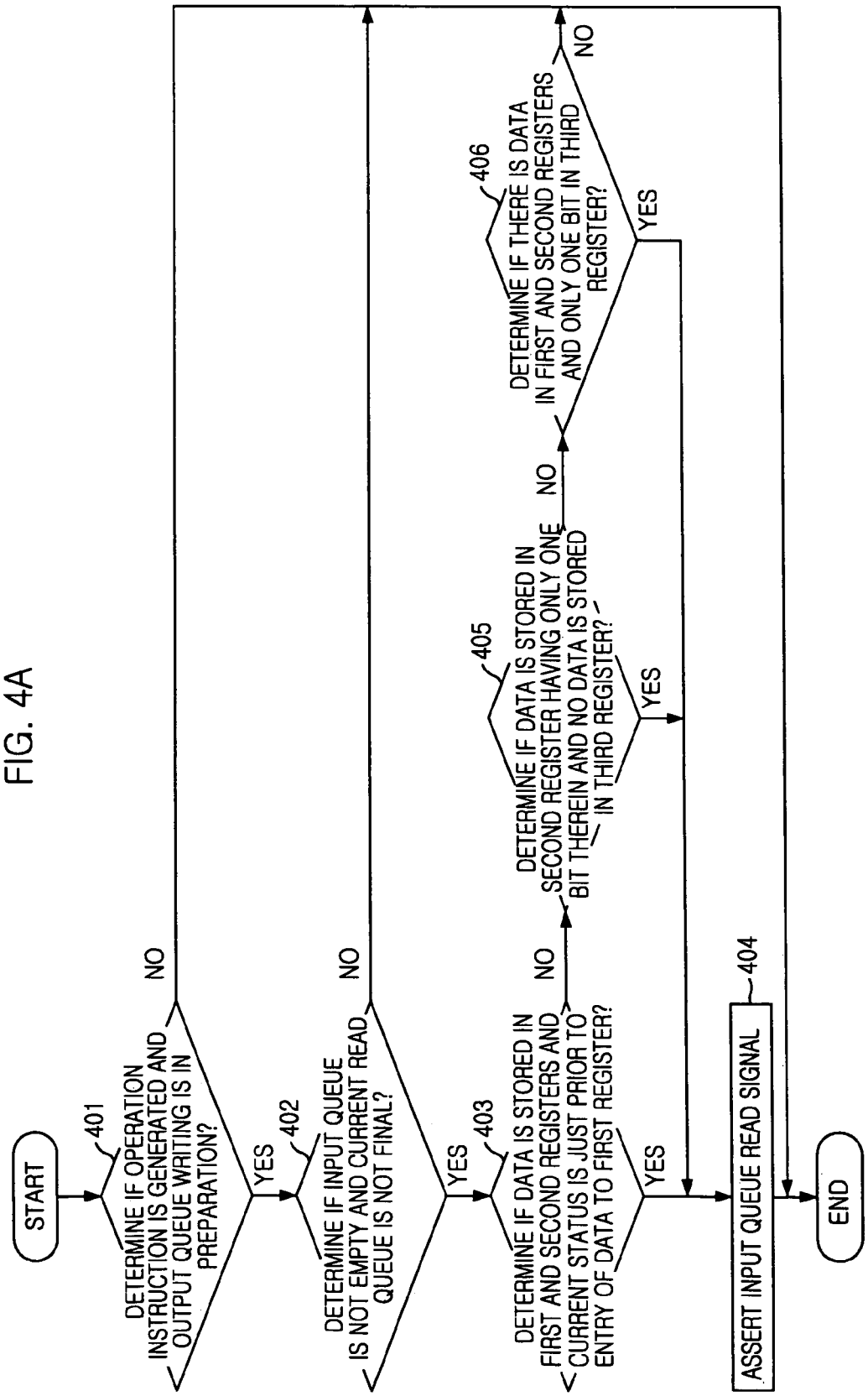
FIGS. 4A to 4E are flowcharts illustrating a condition that the read signal of the input subqueue is generated and a condition that a value of each register is selected.

FIG. 4A illustrates a process of asserting an input queue read. Specifically, at step 401 a decision is made to determine whether an operation instruction is generated and output queue writing is in preparation. If the result is affirmative, the process goes to at step 402 wherein a decision is made to determine whether an input queue is not empty and a current read queue is not the final. If so, at step 403 a decision is made to determine whether data is stored in the first and second registers and the current status is just prior to the entry of data to the first register. Otherwise, at step 404 the input queue read signal is asserted.

On the other side, if at step 403 any data is stored in the first and second registers and the current status is not just prior to the entry of data to the first register, the process goes to step 405 wherein a decision is made to determine whether data is stored in the second register, which has only one bit therein, and no data is stored in the third register. If the result is affirmative, at step 404 the input queue read signal is asserted.

If the result at step 405 is negative, the process goes to step 406 wherein a decision is made to determine whether there is data in the first and second registers and only one bit in the third register. If the result is affirmative, at step 404 the input queue read signal is asserted; if not so, the process is terminated.

Figure 4B:
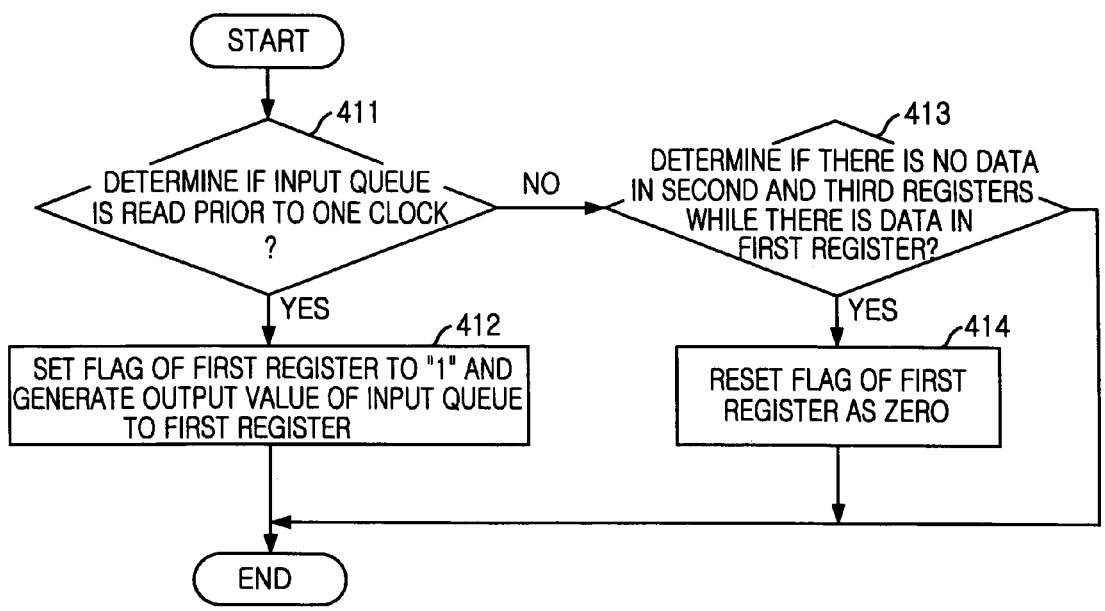

FIG. 4B illustrates a process of setting a value in the first register and a flag thereof. At step 411, if an input queue is read prior to one clock, the process goes to step 412 which sets the flag of the first register to one and outputs the output value of the input queue to the first register.

On the other side, if the input queue is not read prior to one clock, the process goes to step 413 wherein a decision is made to determine whether there is no data in the second and third registers while there is data in the first register. If the result is affirmative, at step 414 the flag of the first register is reset to be zero.

Figure 4C:
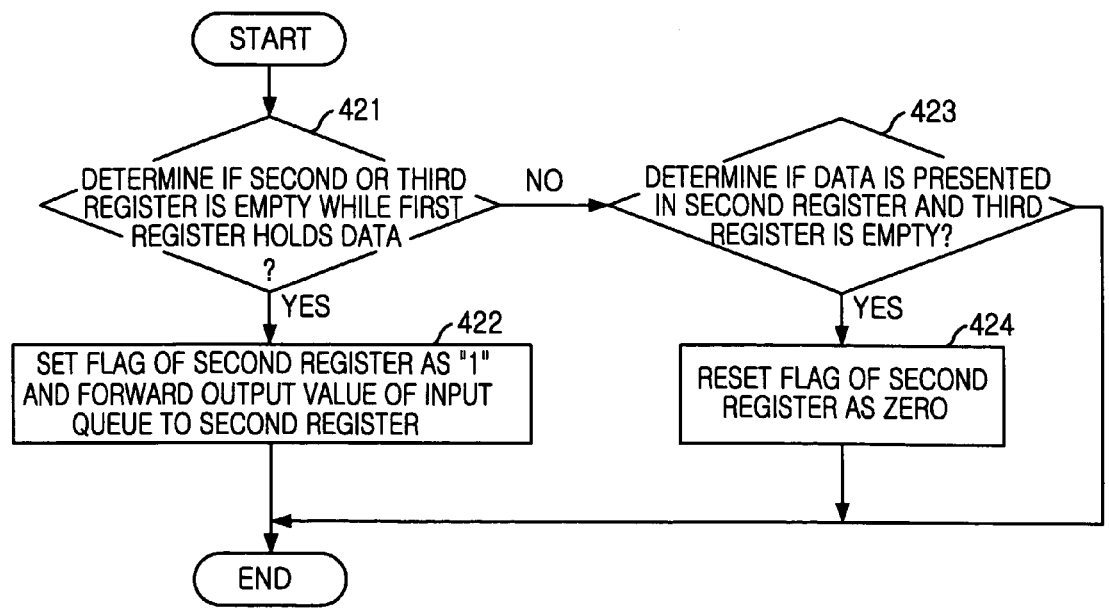

FIG. 4C illustrates a process of setting a value in the second register and a flag thereof. At step 421, a decision is made to determine whether the second or third register is empty while the first register holds the data. If so, at step 422 the flag of the second register is set to be one and the output value of the input queue is forwarded to the second register.

On the other side, if the result at step 421 is negative, the process goes to step 423 wherein a decision is made to determine whether data is presented in the second register and the third register is empty. If so, at step 424 the flag of the second register is reset to be zero.

Figure 4D:
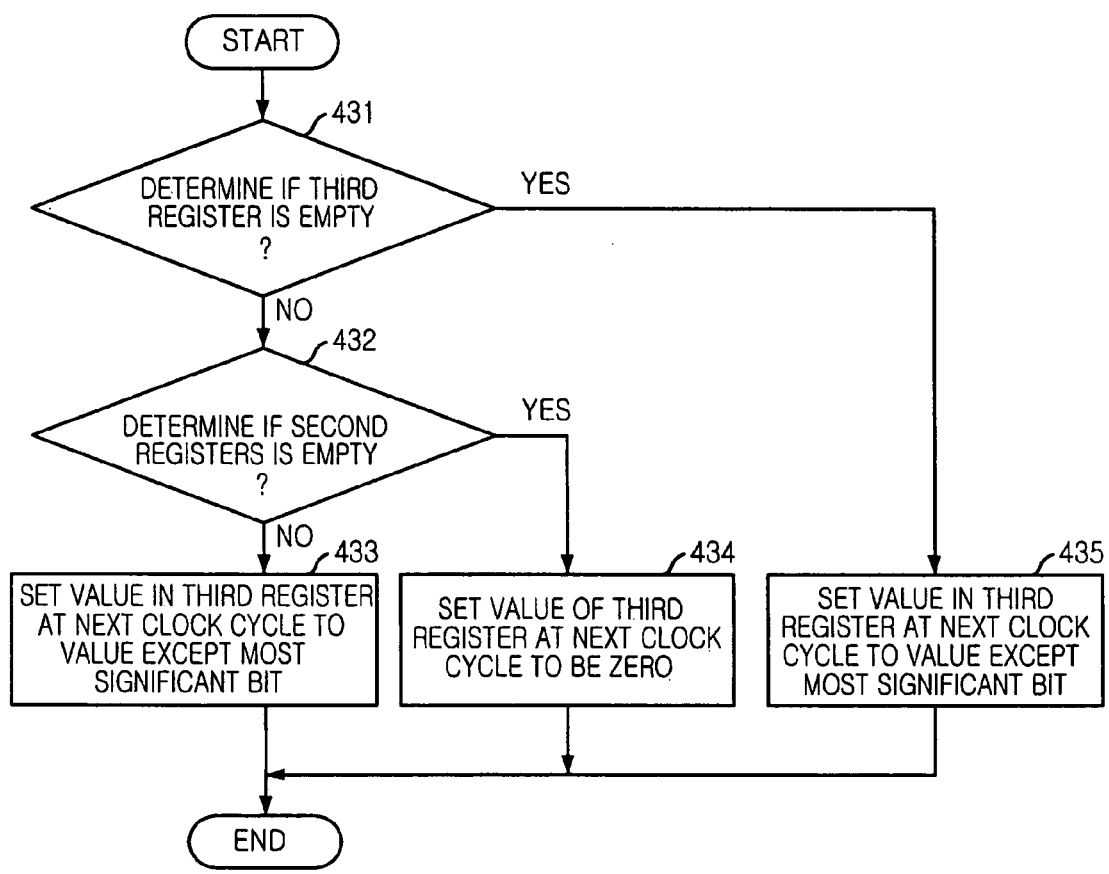

FIG. 4D illustrates a process of determining a value in the third register. At step 431, if the third register is empty, at step 435 the value in the third register at a next clock cycle is set to a value except the most significant bit.

On the other side, if data is presented in the third and second registers (steps 431 and 432), at step 433 the value in the third register at a next clock cycle is set to a value except the most significant bit.

On another side, if data is presented in the third register at step 431 and the second registers is empty at step 432, at step 434 a value of the third register at a next clock cycle is set to be zero.

Figure 4E:
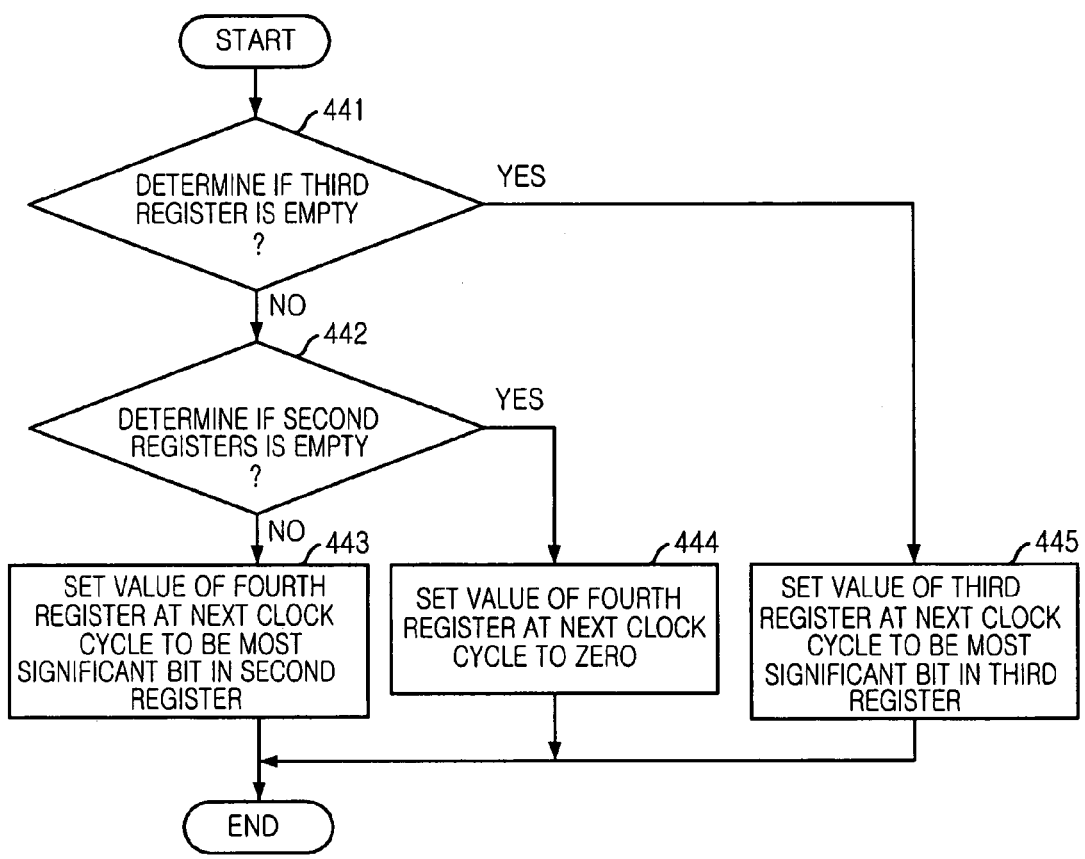

FIG. 4E illustrates a process of determining a value of the fourth register. At step 441, if the third register is empty, at step 445 a value of the third register at a next clock cycle is set to be the most significant bit in the third register.

On the other side, if data is presented in the third and second registers (steps 441 and 442), at step 433 a value of the fourth register at a next clock cycle is set to be the most significant bit in the second register.

On another side, if data is presented in the third register at step 441 and the second registers is empty at step 442, at step 444 a value of the fourth register at a next clock cycle is set to be zero.

A detailed description of read counter management scheme in the memory will now be provided in detail hereinafter.

In accordance with a preferred embodiment of the present invention, it is presume that writing data in the memory is accomplished by providing a write address and a write data together with a write enable signal to the same clock cycle.

Presumed is a synchronous memory in which data is read out in synchronism with a subsequent clock cycle, in the case that a read address and a read enable signal are provided at a clock cycle. If the synchronous memory is used, since data is outputted in synchronism with the same clock cycle, data latched once has the same timing as the synchronous memory to allow it to obtain clear data starting from the beginning of the clock cycle. Unfortunately, a disadvantage may be occurred from the fact that the read address should be quickly provided. In case of reading, the read enable signal may be fixed in an enable state always.

Figure 5:
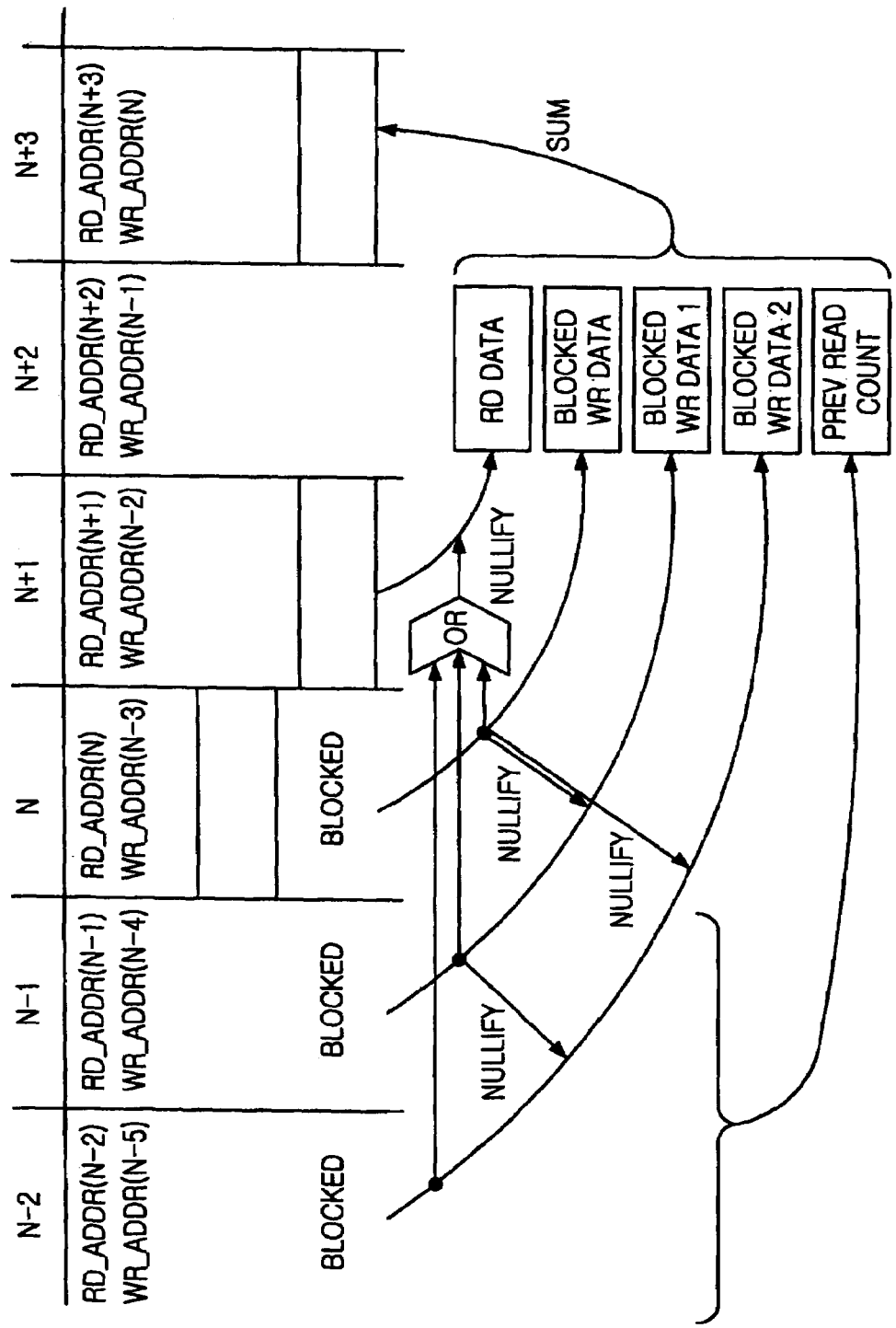
FIG. 5 is a pictorial representation of a process of reading and writing a counter in the memory to implement the multicasting of the present invention.

FIG. 5 is a pictorial representation of a process of reading and writing a counter in the memory to implement the multicasting of the present invention.

A read address RD_ADDR(N) is assigned at a clock cycle N and read data is retrieved at a clock cycle N+1. The synchronous memory requires an access time, allowing the output from the memory to have a considerable amount of delay time in case of a more elevated operation clock relative to the beginning of the clock. For this reason, since it is difficult to immediately use the output data from the memory, a typical scheme, which latches the output data once and uses it at a clock cycle N+2. At a clock cycle N+2, a decision is made to determine whether the read data is final and whether the read data should be incremented by one or rendered to be zero according to the determination result. A value determined finally is over-written in the memory at a clock cycle N+3.

The term "blocking" is defined hereinafter. According to the requirement of most synchronous dual port memories, the read and write addresses are equal with each other, making it difficult to regularly output the read data. In the case that a write address is equivalent of a current read address, a combined logic is used to prevent writing of the memory. When the blocking prevents the writing of the memory, a write attempt value is forwarded to subsequent processes including the read action, which causes the blocking, allowing it to be used as a further pertinent value in lieu of an actual read data. If an actual data is written and then the actual read data may be used.

Suppose that a certain address is being read at the clock cycle N.

When a blocking is occurred during attempting to write data at the same address at the clock cycle N, the write attempt data is forwarded to a next clock cycle, wherein it is considered as the value read at the clock cycle N, and should be used to calculate a value to be written at a clock cycle N+3. In this case, the value actually read at the clock cycle N is disregarded.

If the blocking is occurred at the same address at a clock cycle N−1, if that blocking address is equal to the address read at the clock cycle N (such condition can be appreciated only at the clock cycle N, so the presence or absence of the read address and the blocking should be delayed and stored), and if there is no a blocking at the current clock cycle N, the write attempt value at the clock cycle N−1 is forwarded to a clock cycle N+2 to allow it to be used like the value read at the clock cycle N. Similarly, the value read at the clock cycle N is disregarded.

On the other side, if the blocking is occurred at a clock cycle N−2, if that blocking address is equal to the address read at the current clock cycle N (such condition can also be appreciated only at the clock cycle N, so the presence or absence of the read address and the blocking should be delayed two times for use), and if there is no the blocking at the same address at the clock cycles N−1 and N, the write attempt value at the clock cycle N−2 is forwarded to the clock cycle N+2 to allow it to be used like the value read at the clock cycle N. Similarly, the data read at the clock cycle N is disregarded.

Such data disregard can be achieved by rendering the read data to be zero during delay thereof, selecting a wanted data or a combination of both.

The foregoing illustrates the case that data previously processed is not written by the blocking. However, although the reading at the clock cycle N represents that the final write data written prior to the clock cycle N is written, the same address may be used in writing data at the clock cycles N+1 or N+2. This is the case that a reading process is launched for an address at the clock cycles N−2 or N−1 wherein the address is being read at the clock cycle N. In this case, data written at the clock cycles N+1 and N+2 should be used as the value written at the clock cycle N. Such a problem can be compensated by counting a reading number which reads out the same address at the clock cycles N−2 or N−1 as the address read out at the clock cycle N, and adding same to an actual read value at the clock cycle N.

The inventive method mentioned above may be implemented by a program which is stored in a computer-readable medium such as a compact disk, random access memory (RAM), read only memory (ROM), fixed or flexible disk media, tape, optical-magnetic disk, or any other storage retrieval means, or any combination of these storage retrieval means.

As demonstrated above, the present invention has the ability to multicast a pointer content of input subqueue to a plurality of output subqueues at a maximum speed, allowing the pointer to be forwarded to the output subqueues every time without losing any clock, which, in turn, maintains consistency of a memory value during a sequence of reading, modifying and writing for a counter in the memory.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A multicasting apparatus in a shared memory switch, comprising:
    an input subqueue reading means for reading out data inputted into an input subqueue, selecting one bit from an output port bitmap at a time and outputting output port information of one bit and class information as a data stream together with an enable signal, wherein when ready data is presented in the input subqueue, the input subqueue reading means also reads out the input subqueue prior to the completion of all data processing and continuously sustains its output data stream;
    a queue number encoding means for encoding the bitmap type of output port information provided thereto from the input subqueue reading means, creating a queue number of output subqueues based on the encoded output port information and the class information and outputting the same together with an enable signal; and
    an output subqueue writing means for writing an assigned non-use address of the output subqueues in a tail address of the corresponding output subqueue, responsive to the information from the input subqueue reading means and replacing a subsequent tail address of the corresponding output subqueue with a newly assigned non-use address, thereby writing a corresponding pointer in the corresponding output subqueue.

2. The apparatus of claim 1, wherein the input subqueue reading means comprises:
    a controller for controlling a movement and selection of data;
    a first register for latching and storing therein the sub-cell data of the input subqueue;
    a first calculating means for calculating a next value (waiting value) in a second register;
    the second register for holding a waiting sub-cell data which is not being currently processed responsive to a control signal including a latch enable signal and a data selection signal from the controller;
    a second calculation means for calculating a next value (remaining value) in a third register;
    the third register for holding data, which is in process, and have bits not yet selected, responsive to the control signal from the controller;
    a third calculation means for calculating a next value (selected value) in a fourth register; and
    the fourth register for latching one bit at a time based on the control signal from the controller.

3. The apparatus of claim 1, wherein the pointer indicating an address in which data is stored, is first stored and forwarded to the output subqueue based on the output port bitmap and the class of the read data wherein when the data is multicast data, the same pointer is duplicated to be forwarded to a plurality of output subqueues.

4. The apparatus of claim 3, wherein when the pointer is forwarded from the input subqueue to the corresponding output subqueue, selecting one bit for the data read out of the input subqueue at a time creates a bitmap stream selected only one bit, wherein in case ready data is presented in the input subqueue, the data stored in the input subqueue is read out before being processed all data, thereby preventing a waiting time between data of the input subqueue from being occurred.

5. A multicasting method in a shared memory switch, the method comprising:
    (a) storing a pointer indicating an address in which data is stored in an input subqueue and forwarding the same to an output subqueue based on an output port bitmap and a class of the data, wherein when the data is multicast data, the same pointer is duplicated to be forwarded to a plurality of output subqueues; and
    (b) selecting one bit for the data read out of the input subqueue at a time to create a bitmap stream selected only one bit, when the pointer is forwarded from the input subqueue to the corresponding output subqueue, wherein in case ready data is presented in the input subqueue, the data stored in the input subqueue is read out before being processed all data, thereby preventing a waiting time between data of the input subqueue from being occurred.

6. A multicasting method in a shared memory switch, wherein a final number by which each address is to be read out for multicasting is stored in the addresses of a first predetermined memory; a number reading out a corresponding address at a time in a second predetermined memory distinct from the first predetermined memory, allowing a read value to be increased at each instant of the reading of the corresponding address of the shared memory, wherein the increased value is compared with the final number; if the increased value is less than the final number, the increased value is increased by one; and if the increased value is equal to the final number, the increased value is set to be zero, thereby allowing the address of the shared memory to be returned to an unused address list.

7. The method of claim 6, wherein the reading and writing processes is performed by a sequence of reading, latching, modifying and writing; the consistency of the read and write addresses allows the writing to be canceled; when the writing is canceled by a blocking, write data is back to a previous stage to allow it to be used in lieu of the read data; and when there is data not yet used by a processing delay and it is read out, an actual read number is added to the number of read processes, resulting in a correct writing.

8. The method of claim 7, wherein when the reading and writing processes are performed at the same address to cause the writing to be blocked, a blocked write value is used in lieu of the actual read value by performing a delay of at least two clocks and using a delayed information.

9. The method of claim 8, wherein when the actual read data is not available, the blocked write value is added to an unused value reset to be zero during the delay or multiplexed with the unused value, thereby allowing it to be canceled.

10. A computer-readable medium storing a program for implementing functions comprising:

(a) storing a pointer indicating an address in which data is stored in an input subqueue and forwarding the same to an output subqueue based on an output port bitmap and a class of the data, wherein when the data is multicast data, the same pointer is duplicated to be forwarded to a plurality of output subqueues; and (b) selecting one bit for the data read out of the input subqueue at a time to create a bitmap stream selected only one bit, when the pointer is forwarded from the input subqueue to the corresponding output subqueue, wherein in case ready data is presented in the input subqueue, the data stored in the input subqueue is read out before being processed all data, thereby preventing a waiting time between data of the input subqueue from being occurred.

11. A computer-readable medium storing a program for implementing a function in which a final number by which each address is to be read out for multicasting is stored in the addresses of a first predetermined memory; a number reading out a corresponding address at a time is stored in a second predetermined memory distinct from the first predetermined memory, allowing a read value to be increased at each instant of the reading of the corresponding address of the shared memory, wherein the increased value is compared with the final number; if the increased value is less than the final number, the increased value is increased by one; and if the increased value is equal to the final number, the increased value is set to be zero, thereby allowing the address of the shared memory to be returned to an unused address list.

* * * * *